United States Patent
Ikeda

(10) Patent No.: US 10,057,440 B2
(45) Date of Patent: Aug. 21, 2018

(54) IMAGE READING APPARATUS AND IMAGE FORMING APPARATUS

(71) Applicant: CANON KABUSHIKI KAISHA, Tokyo (JP)

(72) Inventor: Masahito Ikeda, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/244,333

(22) Filed: Aug. 23, 2016

(65) Prior Publication Data

US 2017/0070626 A1    Mar. 9, 2017

(30) Foreign Application Priority Data

Sep. 7, 2015   (JP) ................................ 2015-175811

(51) Int. Cl.
*G03G 15/00* (2006.01)
*H04N 1/00* (2006.01)
*H04N 1/04* (2006.01)

(52) U.S. Cl.
CPC ..... *H04N 1/00554* (2013.01); *H04N 1/00538* (2013.01); *H04N 1/00557* (2013.01); *H04N 1/00588* (2013.01); *H04N 1/04* (2013.01); *H04N 2201/0082* (2013.01)

(58) Field of Classification Search
CPC ................................................ H01N 1/00554
USPC ........................................................ 399/380
See application file for complete search history.

(56) References Cited

U.S. PATENT DOCUMENTS

| 5,822,655 | A | 10/1998 | Ikeda | |
|---|---|---|---|---|
| 7,440,712 | B2* | 10/2008 | Uchida | G03G 15/60 399/107 |
| 7,490,824 | B2* | 2/2009 | Kakuta | G03G 15/605 271/264 |
| 7,512,376 | B2* | 3/2009 | Suzuki | G03G 15/605 16/239 |

(Continued)

FOREIGN PATENT DOCUMENTS

| JP | 2003-343522 A | 12/2003 |
|---|---|---|
| JP | 2008-131338 A | 6/2008 |

(Continued)

OTHER PUBLICATIONS

Japanese Office Action issued in corresponding Japanese Application No. 2015175811 dated Oct. 3, 2017.

(Continued)

*Primary Examiner* — Anthony Nguyen
(74) *Attorney, Agent, or Firm* — Fitzpatrick, Cella, Harper & Scinto

(57) ABSTRACT

An image reading apparatus has an image reading portion, a sheet feeding portion feeding the sheet to the image reading portion, a rotatably connecting portion which rotatably connects the sheet feeding portion to the image reading portion, a fixing member, a first fastening member for fastening the fixing member to a frame of the sheet feeding portion, and a second fastening member for fastening the fixing member to the rotatably connecting portion in a state where the frame is nipped between the rotatably connecting portion and the fixing member. When the fastening of the first fastening member is released and the fastening of the second fastening member is released, the fixing member is detachable from the frame and the rotatably connecting portion.

9 Claims, 14 Drawing Sheets

(56) References Cited

U.S. PATENT DOCUMENTS

| | | | |
|---|---|---|---|
| 7,536,148 B2* | 5/2009 | Fukumura | G03G 15/602 |
| | | | 358/496 |
| 8,139,994 B2* | 3/2012 | Suzuki | G03G 15/605 |
| | | | 16/221 |
| 8,373,911 B2 | 2/2013 | Iwata et al. | |
| 2002/0098023 A1* | 7/2002 | Mitomi | H04N 1/0057 |
| | | | 399/374 |
| 2007/0047024 A1* | 3/2007 | Onose | H04N 1/00519 |
| | | | 358/474 |
| 2008/0028573 A1* | 2/2008 | Tsai | H04N 1/00535 |
| | | | 16/245 |
| 2013/0083368 A1* | 4/2013 | Yamazaki | G03G 15/605 |
| | | | 358/474 |
| 2014/0063572 A1* | 3/2014 | Yamasaki | H04N 1/1017 |
| | | | 358/497 |
| 2015/0015920 A1* | 1/2015 | Muraoka | H04N 1/00543 |
| | | | 358/400 |
| 2015/0016796 A1* | 1/2015 | Chatellard | H04Q 1/13 |
| | | | 385/135 |

FOREIGN PATENT DOCUMENTS

| | | |
|---|---|---|
| JP | 4139138 A | 8/2008 |
| JP | 2012-049940 A | 3/2012 |

OTHER PUBLICATIONS

Dec. 19, 2017 Japanese Official Action in Japanese Patent Appln. No. 2015-175811.

* cited by examiner

B—B

IMAGE READING APPARATUS AND IMAGE FORMING APPARATUS

BACKGROUND OF THE INVENTION

Field of the Invention

The present invention relates to an image reading apparatus such as a copying machine and a scanner, in which a sheet feeding portion can be opened and closed with respect to an image reading potion via a connection portion for rotation, and an image forming apparatus.

Description of the Related Art

Conventionally, a fixed reading system and a flow reading system are used in order to optically read an image of a sheet-like original. In the fixed reading system, an image is read while an image reading portion scans an original placed on platen glass having an area larger than the size of the original. On the other hand, in the flow reading system, originals are conveyed one by one from the original feeding portion which is disposed above the image reading portion and images of the originals are read while the originals are being conveyed.

In an image reading apparatus adopting the flow reading system, it is common that the fixed reading system can be also performed by rotatably attaching the original feeding portion to the image reading portion and the original feeding portion can be opened above the platen glass. The image reading apparatus which can perform both of the flow reading system and the fixed reading system is becoming mainstream in copying machines and scanners because a thick original such as a book can be read in addition to the fact that a large number of originals can be read successively.

The attachment of the original feeding portion to the image reading portion is performed by providing a hinge at the back side of the original feeding portion and by fixing the hinge to the back side of the image reading portion. The means of fixing includes two types in general. One type is for fixing the hinge to the image reading apparatus with screws. The other type is for inserting a shaft like hinge into a hole provided at the image reading portion. The former type is mainly used for the case in which strong fixation is necessary in the apparatus which has a large-sized original feeding portion and in which a strong load force is applied to the hinge. On the other hand, the latter type is mainly used for the case in which the apparatus has a small-sized original feeding portion and easy attachment is given high priority.

The most common method of attaching the hinge to the original feeding portion is fastening with screws the hinge to screw holes formed at a frame of the original feeding portion. With this method, the hinge can be maintained by a simple configuration without a special extra member.

The weight of the original feeding portion is about 7 to 23 kg although the weight varies depending on the product specification. Thus, when the configuration is adopted in which screws are simply used for fastening, there is a concern of fastening failure due to damage of the screw holes because the majority of the weight load is applied to the screw holes not only when the original feeding portion is opened but also when the original feeding portion is closed.

As a configuration of fixing a member with screws, Japanese Patent Application Publication 2003-343522 discloses a fixing configuration in which a part of a detachable second member is overlapped with a first member and the overlapped portion is fastened with screws. This configuration could be applied for attaching the hinge to the original feeding portion.

For example, the hinge is formed of a sheet metal as the first member and the original feeding portion is attached to the hinge by nipping a frame of the original feeding portion between the hinge and the second member and by fastening these members by screws. In this case, it is not necessary to provide a screw portion on the frame of the original feeding portion if enough fastening strength between the first member and the second member is obtained. The weight of the original feeding portion is received at the surfaces of the first member and the second member, thereby obtaining stable fixing strength.

Even if the fastening portion between the two members is broken, only the first member or the second member should be replaced with a new one and the original feeding portion itself can be used as it is.

However, in the configuration in which the hinge is attached by nipping the original feeding portion with the first member which is a part of the hinge and the second member, the first member and second member are not fixed to the frame of the original feeding portion until the first member and the second member are fastened to each other. Thus, for example it is necessary to fasten the first member and the second member with the screws by one hand while holding the first member and the second member by another hand, causing difficulty in attachment if the first member is a heavy member such as a hinge.

In exchanging the hinge when an abrupt malfunction occurs to the hinge, the second member does not remain at the predetermined position of the frame and the second member is detached and there is a possibility that the second member gets deep into the apparatus, causing difficulty in detachment of the hinge.

SUMMARY OF THE INVENTION

An object of the present invention is to provide an image reading apparatus and an image forming apparatus in which a hinge can be easily attached to and detached from the original feeding portion.

An image reading apparatus according to the present invention comprises:
- an image reading portion configured to read an image on a sheet;
- a sheet feeding portion configured to feed the sheet to the image reading portion;
- a rotatably connecting portion which rotatably connects the sheet feeding portion to the image reading portion;
- a fixing member;
- a first fastening member configured to fasten the fixing member to a frame of the sheet feeding portion; and
- a second fastening member configured to fasten the fixing member to the rotatably connecting portion in a state where the frame is nipped between the rotatably connecting portion and the fixing member, wherein in case the fastening of the first fastening member is released and the fastening of the second fastening member is released, the fixing member is detachable from the frame and the rotatably connecting portion.

In the present invention, it is not necessary to hold the fixing member when the rotatably connecting portion is attached to the original feeding portion and the fixing member becomes inadvertently detached. Thus, the rotatably connecting portion can be easily attached and detached.

Further features of the present invention will become apparent from the following description of exemplary embodiments with reference to the attached drawings.

DESCRIPTION OF THE EMBODIMENTS

Hereinafter, the description will be made with reference to the drawings in detail to an image reading apparatus according to an embodiment of the present invention.

Figure 1:
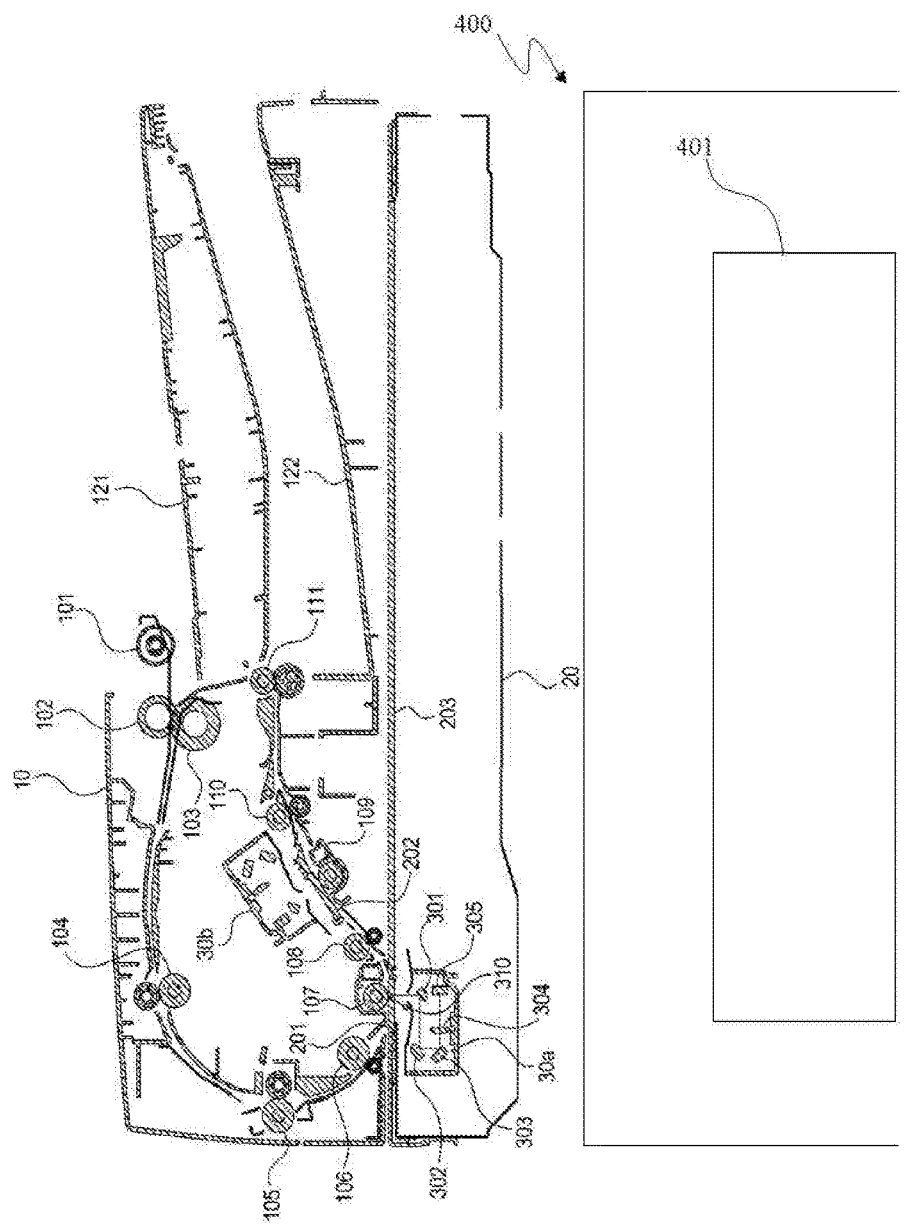
FIG. 1 is a diagram of a schematic cross-sectional view of an original feeding portion and an image reading portion.

<Image reading portion> FIG. 1 is a schematic sectional view of an image reading apparatus of this embodiment. As shown in the Figure, an original feeding portion (sheet feeding portion) is disposed above the image reading portion. The reading optical box 30$a$ is provided in the image reading portion 20. An image can be read by the fixed reading system in which an image on an original (sheet) placed on the fixed reading glass 203 is read and by the flow reading system in which an image of an original conveyed on the flow reading glass 201 at the original feeding portion 10.

The reading optical box 30$a$ includes the lighting device 310 which irradiates a light to a surface of an original on which there is an image, the mirrors 301, 302 and 303 which guide to the imaging lens 304 the reflected and scattered light from the original to which a light is irradiated by the lighting device 310, and the charge coupled device 305. The reading optical box 30$a$ is connected to a motor with a timing belt which is not illustrated and is movable along the fixed reading glass 203.

In the fixed reading system, an image of an original is read while the optical box 30$a$ is moved along the fixed reading glass 203 at a constant speed with respect to the original placed on the fixed reading glass 203. In the flow reading system, the reading optical box 30$a$ waits at the reading position (the position shown by FIG. 1) and an image of the original is read while the original is conveyed at a constant speed by the original feeding portion 10.

<Original feeding portion> The original feeding portion 10 includes the pickup roller 101 which separates and feeds the originals stacked on the original stacking tray 121 one by one, the separating roller 102 and the loosening roller 103. The original feeding portion 10 further includes the conveying roller pairs 104, 106, 108 and 110 for conveying the picked-up original, the registration roller pair 105, the platen rollers 107 and 109, rollers such as the discharge roller pairs 111, the original discharge tray 122, the rear surface reading glass 202 and the rear surface reading optical box 30$b$.

When original scanning is performed by the original feeding portion 10 using the flow reading system, a user places an original on the original stacking tray 121 with the front surface of the original upward. The original stacking tray 121 is equipped with an original size detecting sensor (not shown) for recognizing the length and width of the original. By the sequence according to the size of the original, an image of the original is read by the original feeding portion which will be explained in detail.

When the reading is started in the flow reading system, the originals stacked on the original stacking tray 121 are fed by the pick-up roller 101 and are loosened one by one at the nip portion between the separating roller 102 and the loosening roller 103 and are conveyed via the conveying roller pair 104 to the nip portion of the registration roller pair 105. At the time when an original arrives at this nip, the registration roller pair 105 is in a stopped state. By this configuration, the tip of the original is stopped at the nip portion. In addition, the rear end of the original is pushed in a predetermined amount by the conveying roller pair 104 provided at the upstream side in the conveying direction, thereby generating a curve on the original. By the stiffness of paper by this curve, the tip of the original is aligned with the nip line of the registration roller pair, thereby correcting the oblique conveyance of the original.

After this correction, the original conveyance of the registration roller pair 105 is started and the original passes through the conveying roller pair 106. The front surface of the original is read at a predetermined constant speed on the flow reading glass 201. When the operation for additionally reading the rear surface of the original is performed after the front surface is read, the rear surface of the original is successively read at the reading position on the rear surface reading glass 202 by the rear surface reading optical box 30$b$. After that, the original is discharged to the original discharge tray 122 by the conveying roller pair 110 and the discharge roller pair 111.

Further, the original feeding portion 10 is rotatably attached to the image reading portion 20. By this configuration, the original feeding portion 10 can be opened and closed and the apparatus has the open state in which the fixed reading glass 203 is exposed and the closed state in which the fixed reading glass 203 is covered. When the original is read by the fixed reading system, the original feeding portion 10 is opened by rotation and the original is placed on the fixed reading glass 203 with the surface of the original on which there is an image downward and the original feeding portion 10 is closed in order to press the original. In this state, the image of the original is read while the reading optical box 30a is moved at a constant speed.

<hinge configuration> Next, the configuration of the hinge as a rotatably connecting portion for rotatably connecting the original feeding portion 10 with the image reading portion 20 will be explained.

Figure 2:
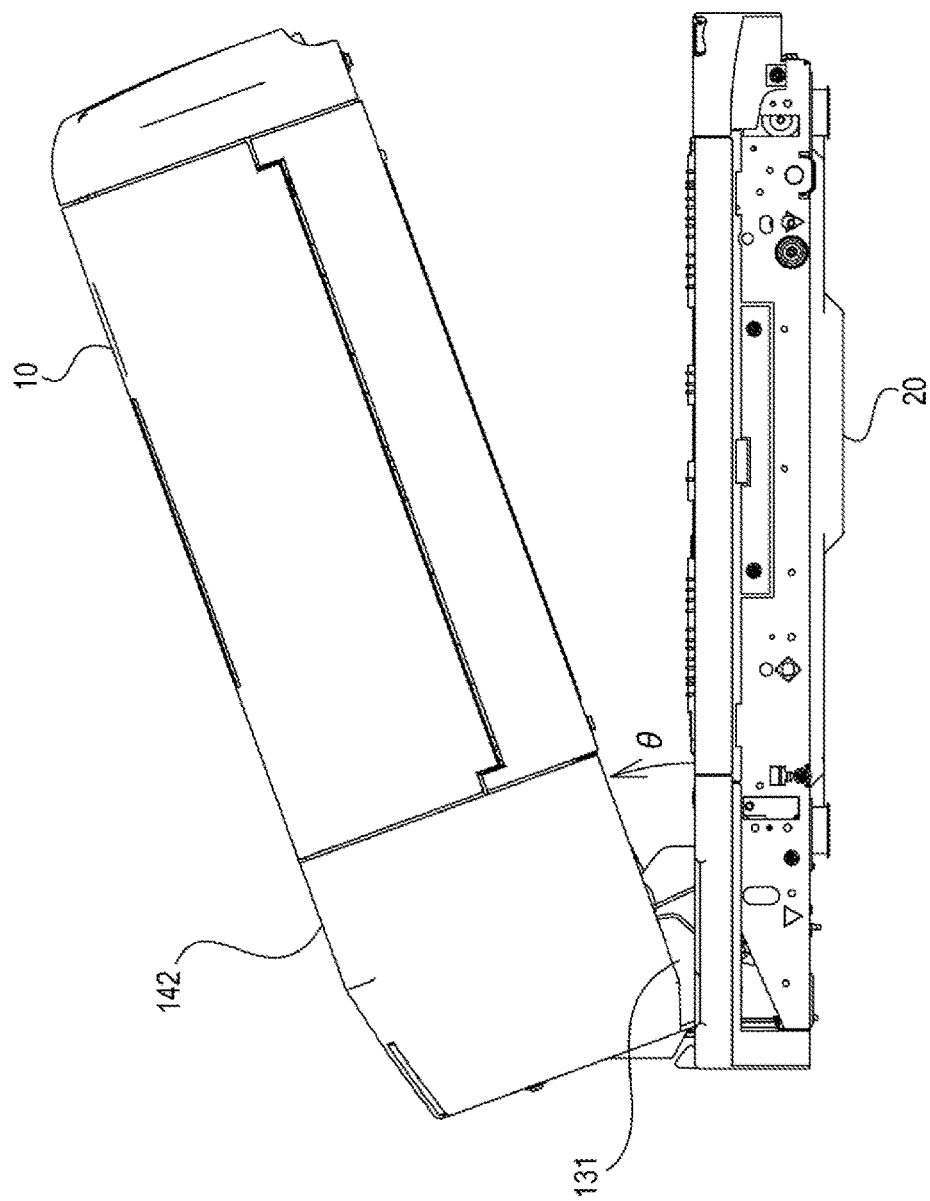
FIG. 2 is a diagram of a side view of the original feeding portion and the image reading portion.
Figure 3:
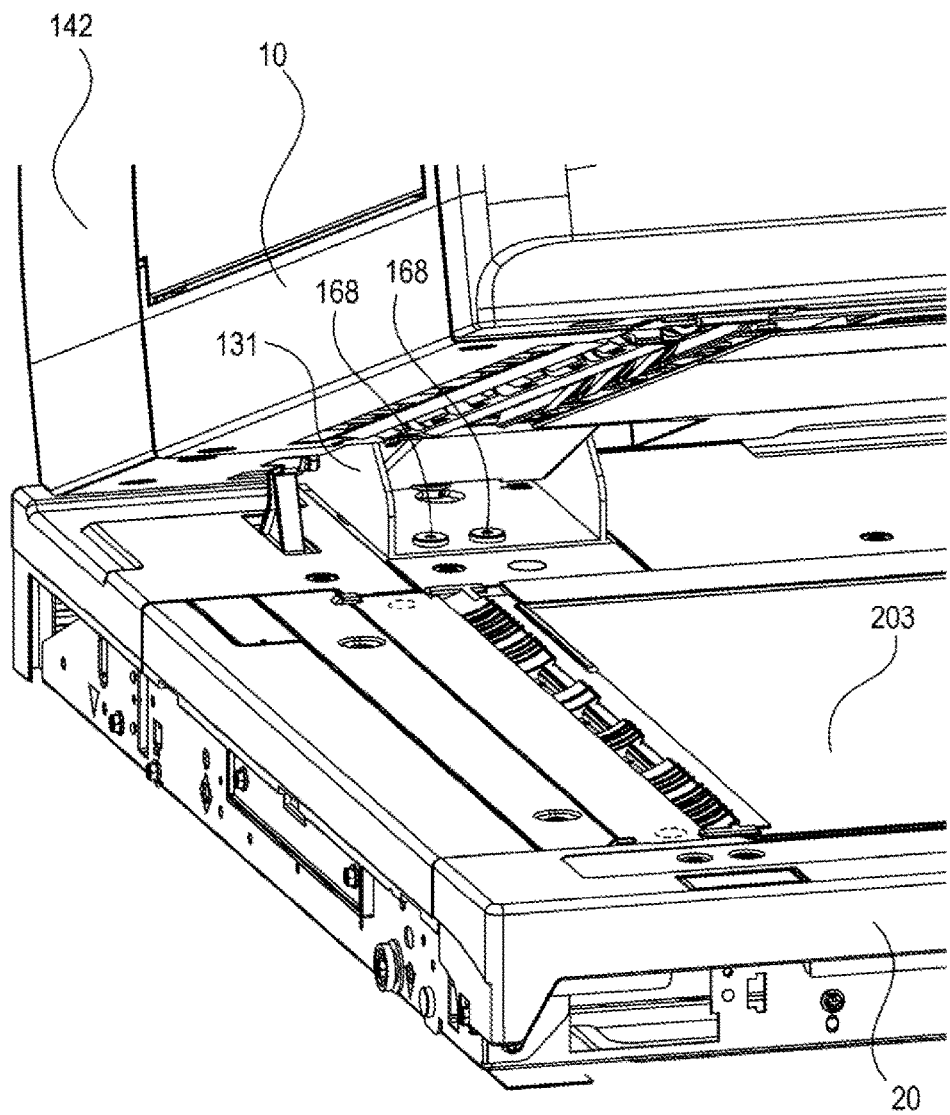
FIG. 3 is a diagram of a perspective view of the original feeding portion and the image reading portion in the state where the original feeding portion is opened with respect to the image reading portion at the hinge.
Figure 4:
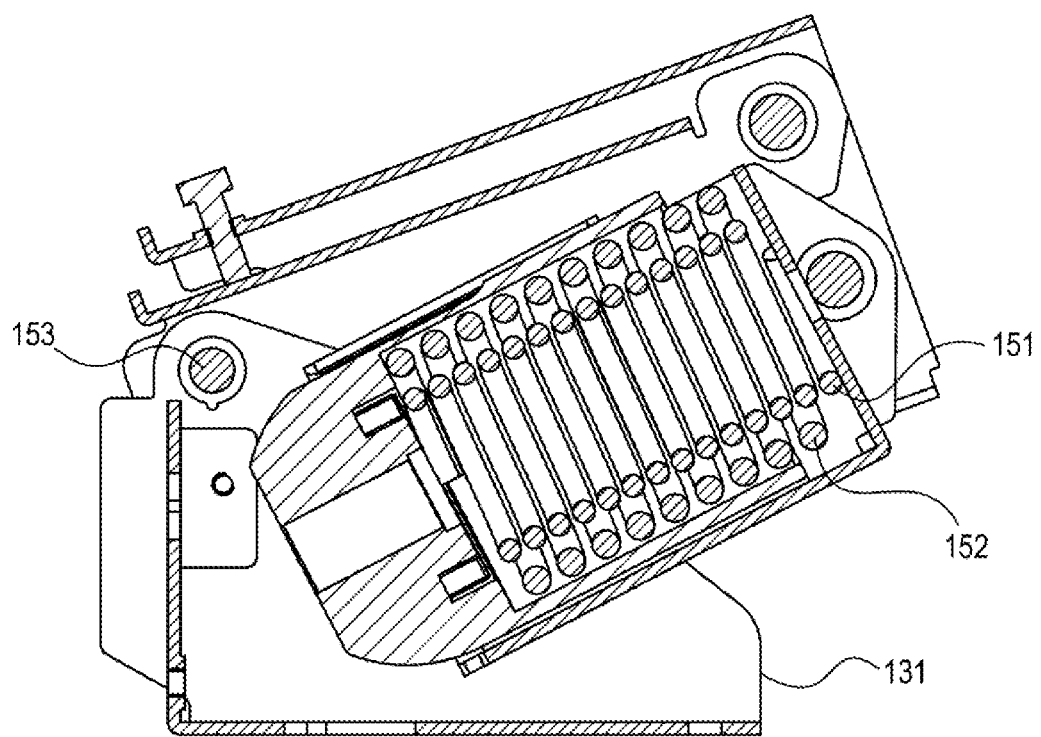
FIG. 4 is a diagram of a cross-sectional view of the hinge provided on the original feeding portion.

The image reading portion 20 and the original feeding portion 10 are connected with each other by the hinge 131 as the rotatably connecting portion provided on the back side of the apparatus as shown in FIGS. 2 and 3. By this configuration, the original feeding portion 10 rotates about the hinge rotating axis 153 of the hinge 131 shown in FIG. 4 and the upper surface of the image reading portion 20 can be exposed. The compression springs 151 and 152 are provided in an inner space of the hinge 131 in order to give torque in the direction in which the original feeding portion 10 opens.

Figure 5:
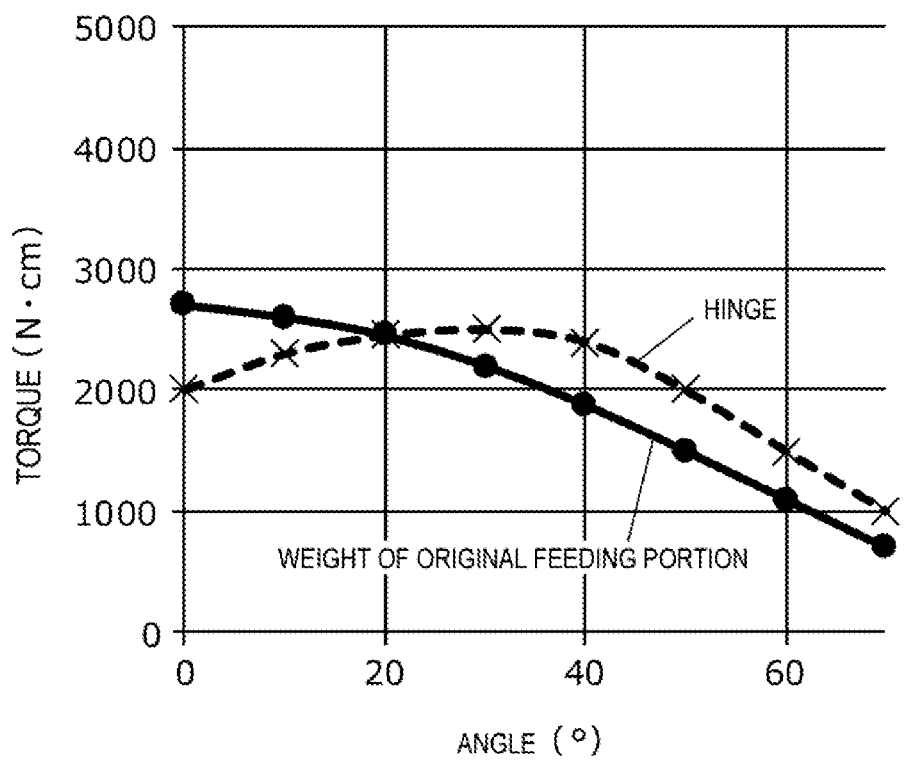
FIG. 5 is a torque diagram around the hinge rotating axis when the original feeding portion is opened and closed.

FIG. 5 is a graph showing torque about the hinge rotating axis 153 when the original feeding portion 10 opens. When the opening and closing angle θ is less than 20°, the torque in the closing direction of the original feeding portion 10 by its weight is adjusted to be greater than the hinge torque and therefore the original feeding portion 10 will close by its weight. When the opening and closing angle θ is greater than 20°, a sliding resistance (not shown in the graph) is produced in the inside of the hinge and the total of its friction torque and the torque of the original feeding portion by its weight is adjusted to balance the hinge torque. Thus, the original feeding portion 10 can remain stationary while maintaining its opening and closing angle without any support by an external force and a user can set an original on the fixed reading glass 203 without holding the original feeding portion 10 by hands.

Figure 6:
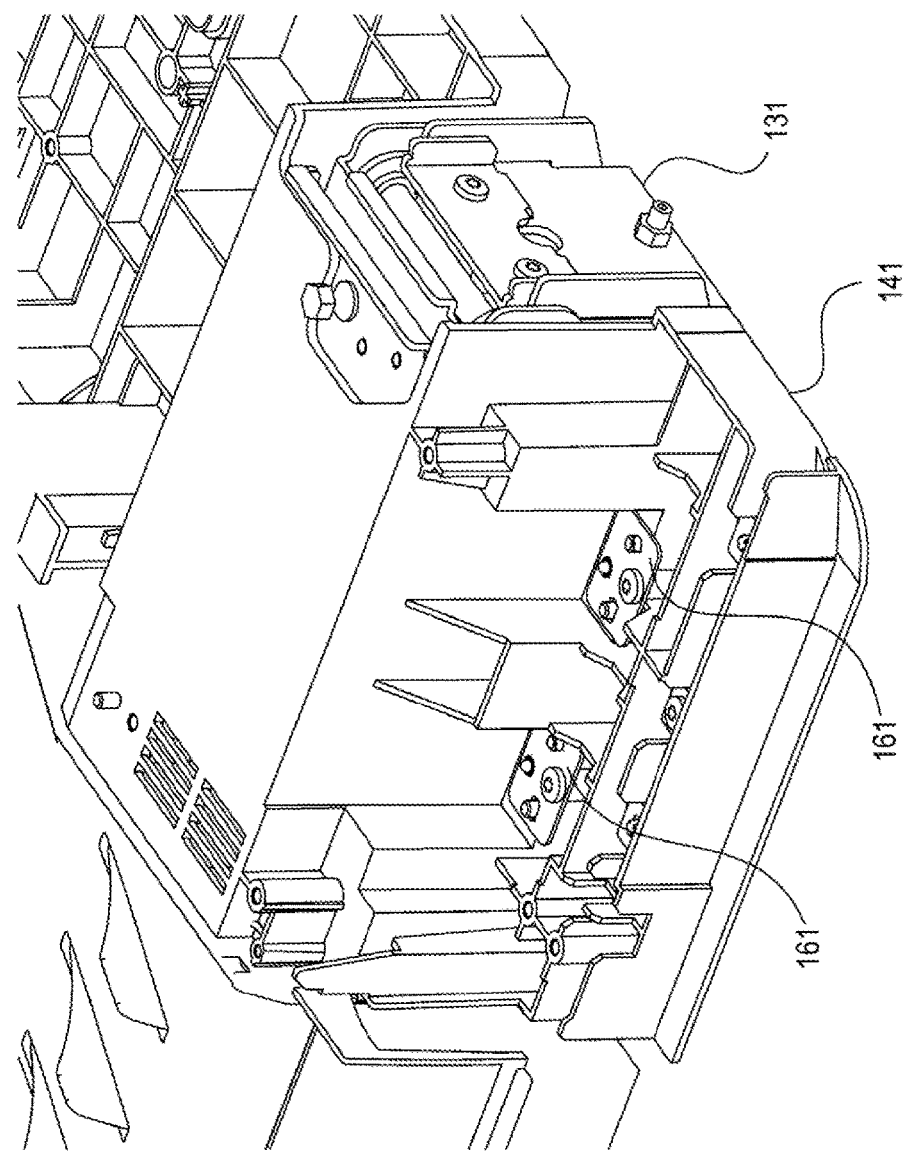
FIG. 6 is a diagram of a perspective view of a hinge attaching portion to the housing of the original feeding portion.
Figure 7:
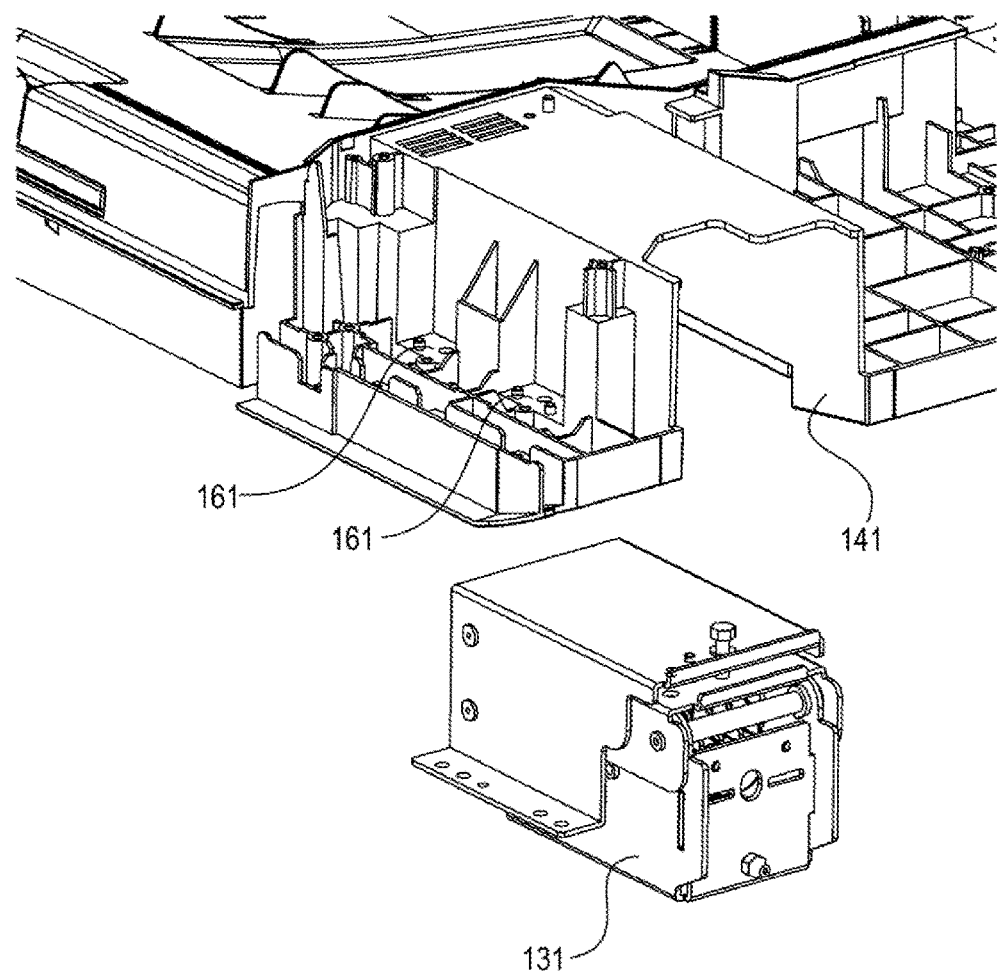
FIG. 7 is a diagram of a perspective view of the state where the hinge is detached from the housing.
Figure 8:
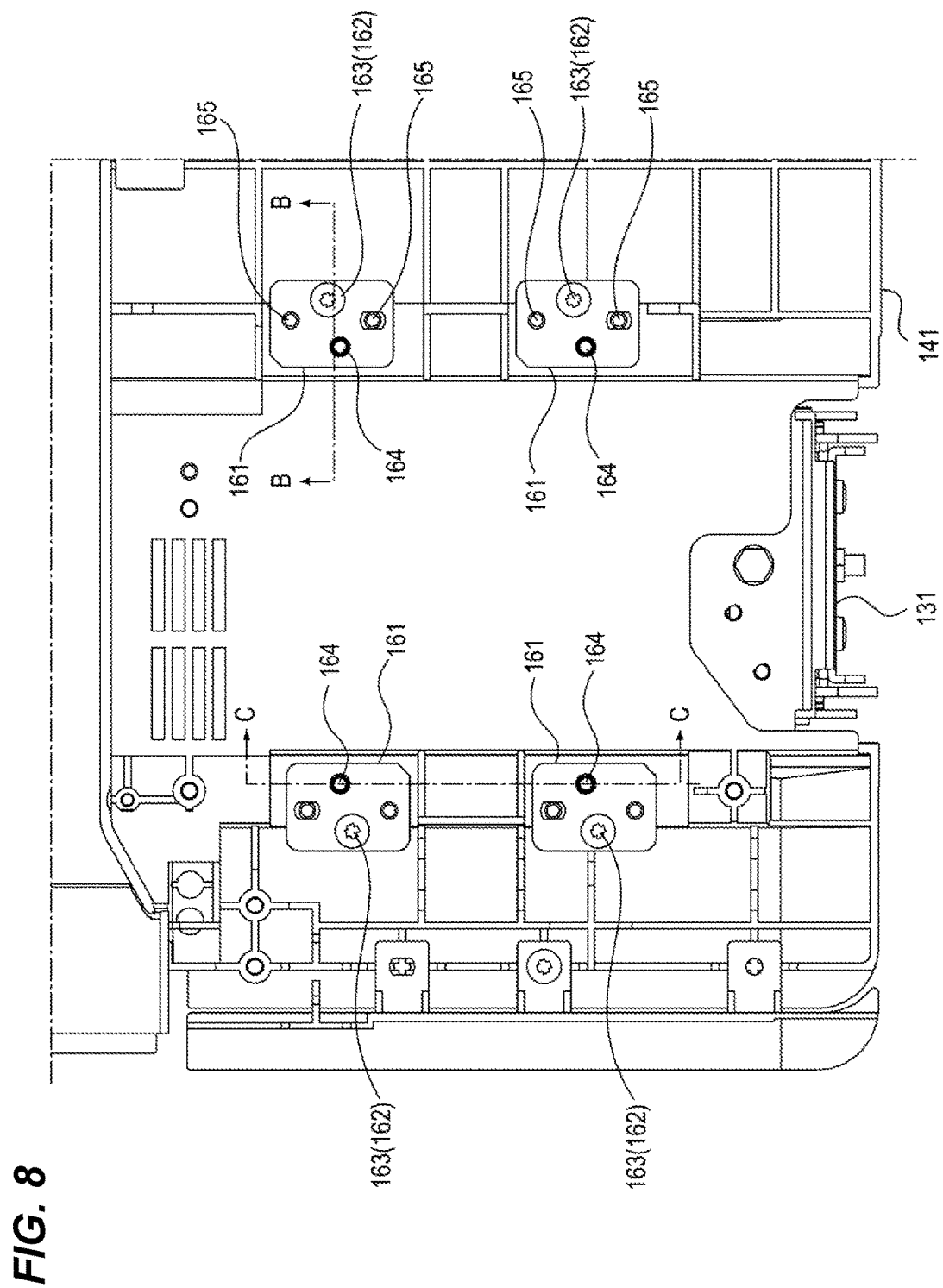
FIG. 8 is a diagram of a top view of the hinge attaching portion to the housing of the original feeding portion.
Figure 9:
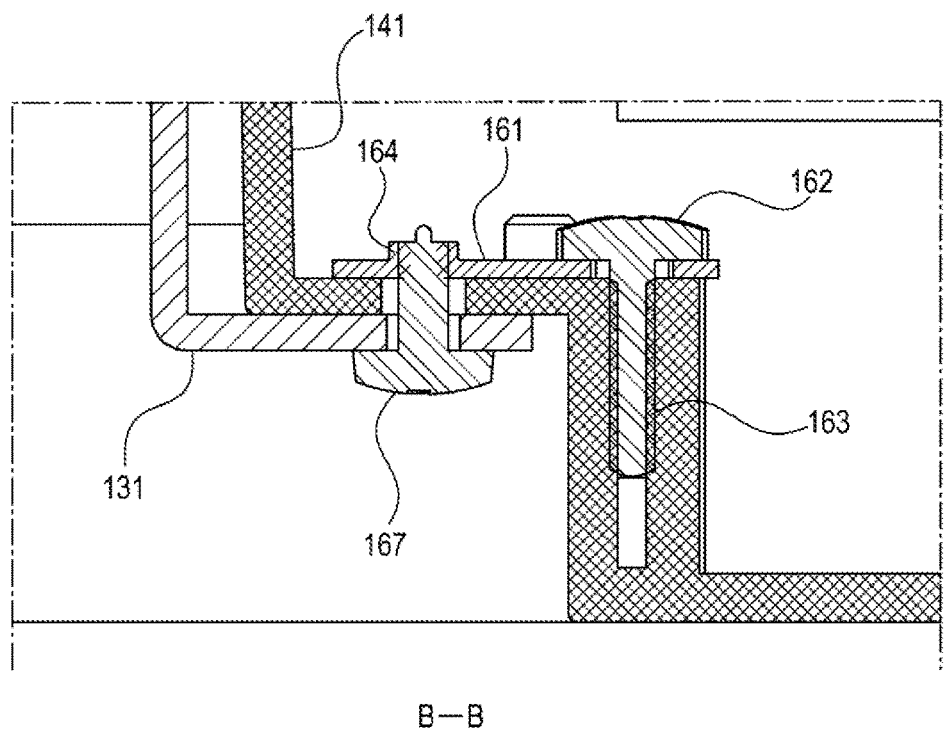
FIG. 9 is a diagram of a B-B cross-sectional view of FIG. 8.
Figure 10:
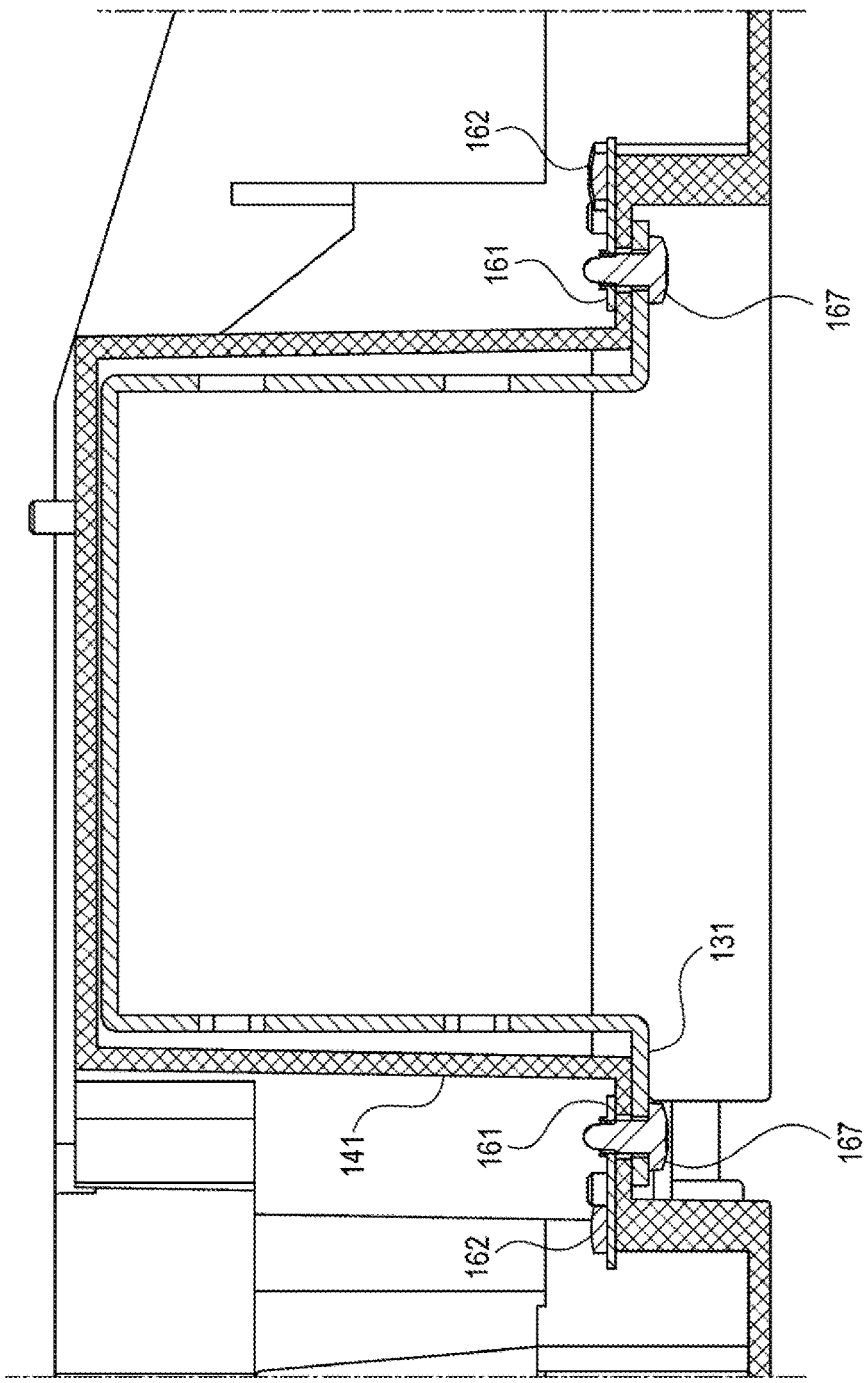
FIG. 10 is a diagram of a cross-sectional view of the hinge attaching portion to the housing of the original feeding portion.
Figure 11:
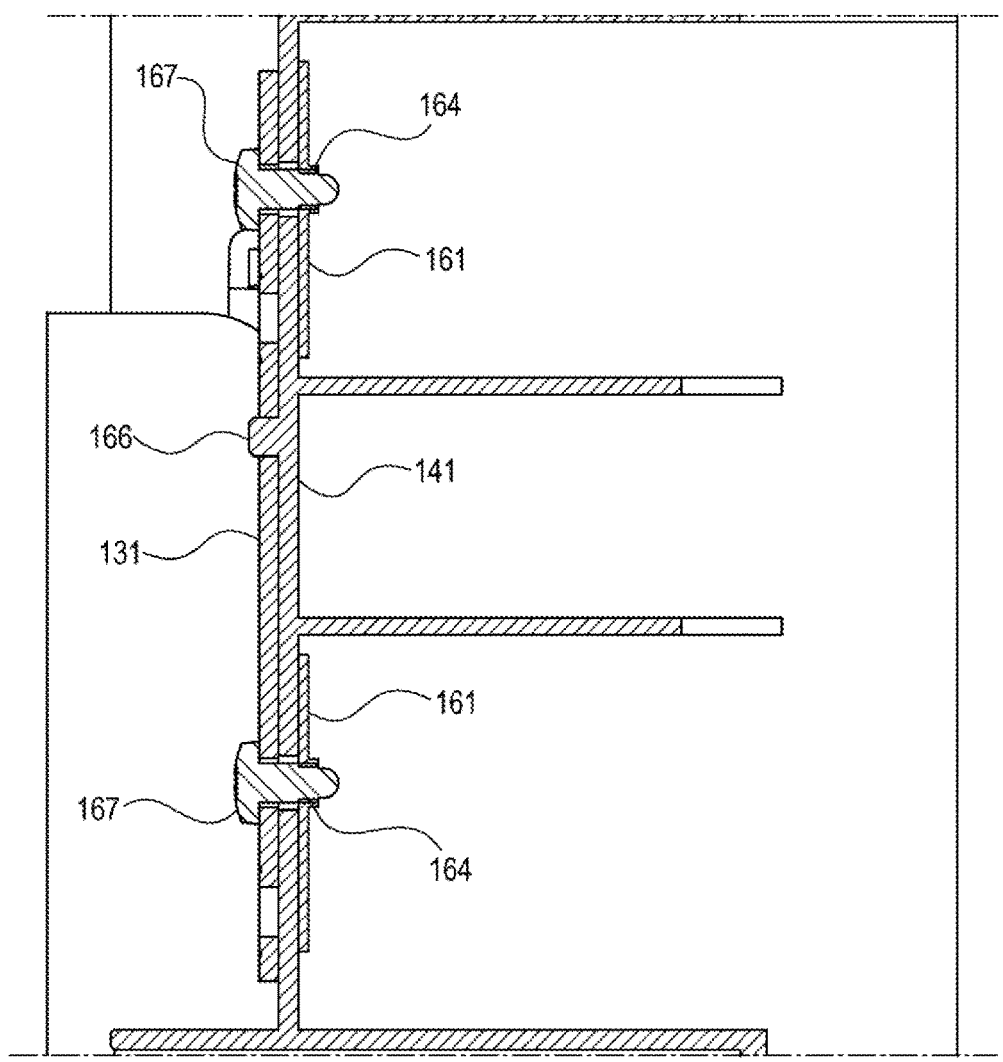
FIG. 11 is a diagram of a C-C cross-sectional view of FIG. 8.
Figure 12:
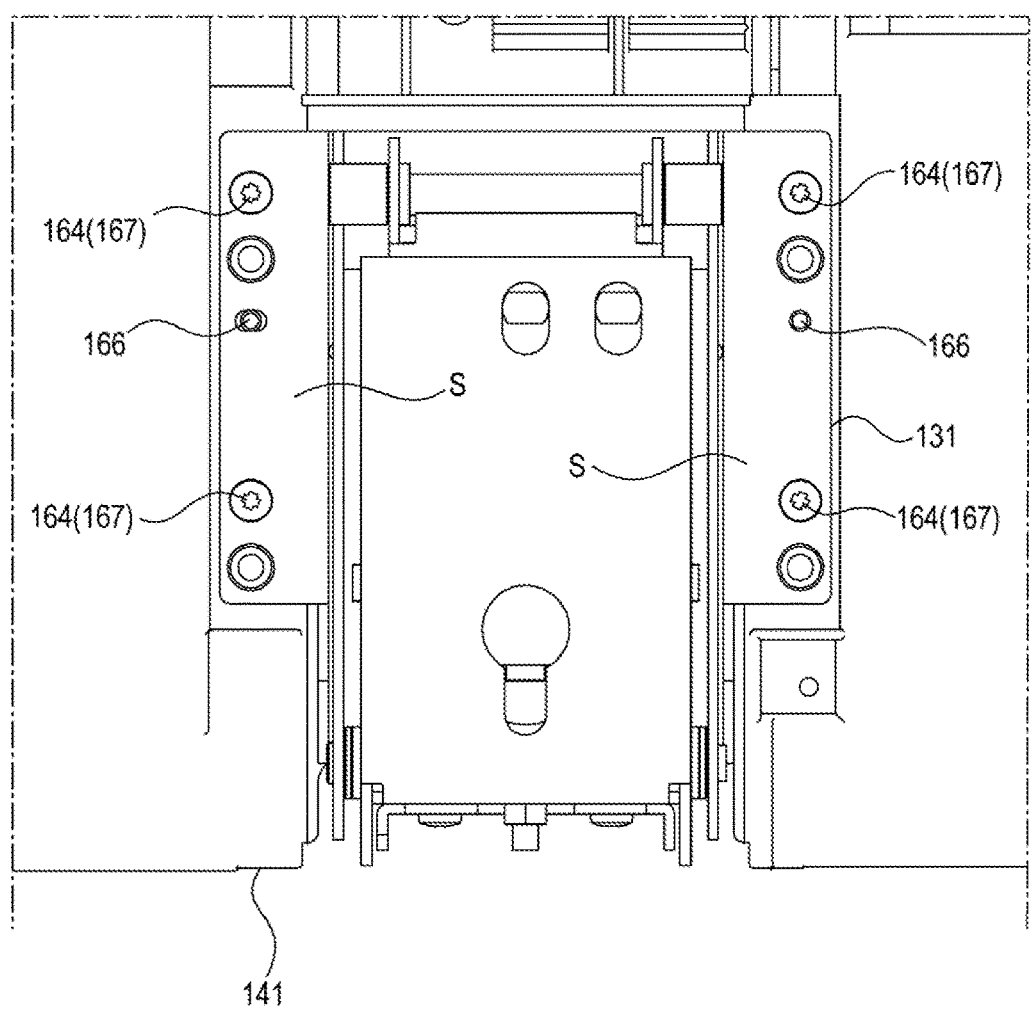
FIG. 12 is a diagram of a bottom view of the hinge attaching portion to the housing of the original feeding portion.
Figure 13:
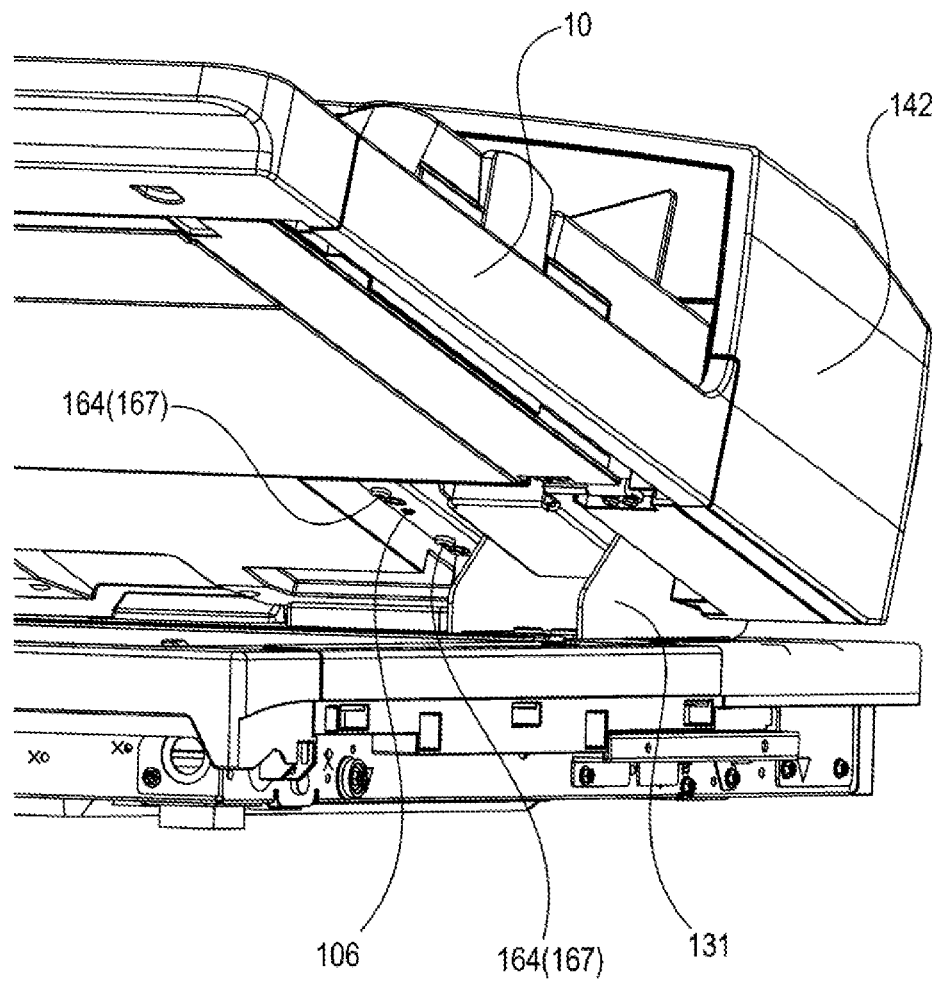
FIG. 13 is a diagram of a perspective view of the state where the original feeding portion is opened at the hinge.

<Configuration for attaching the hinge> Next, the configuration for attaching the hinge 131 will be explained with reference to FIGS. 6 to 13. FIG. 6 is a diagram of a perspective view of the attaching portion of the hinge 131 to the original feeding portion 10. FIG. 7 is a diagram of a perspective view of state in which the hinge 131 is detached from the housing 141. FIG. 8 is a diagram of a top view of the hinge attaching portion. FIG. 9 is a diagram of a B-B cross-sectional view of FIG. 8. FIG. 10 is a diagram of an enlarged cross-sectional view of FIG. 9. FIG. 11 is a diagram of a C-C cross-sectional view of FIG. 8. FIG. 12 is a diagram of a bottom view of the hinge attaching portion. FIG. 13 is a diagram of a perspective view of the state in which the original feeding portion is opened at the hinge.

The upper portion of the original feeding portion 10 is covered by the outer cover 142 (shown in FIGS. 2 and 3). Namely, the outer cover 142 is attached to the surface (upper surface) which is opposed to the original pressing surface side which is exposed when the original feeding portion 10 is opened with respect to the image reading portion 20 so that the inside of the original feeding portion is not exposed.

FIGS. 6 and 7 show the state in which the outer cover 142 is removed. As shown in FIG. 6, when the outer cover 142 is removed, the housing 141 as a frame of the original feeding portion 10 is exposed. The fixing member 161 for attaching the hinge 131 is attached to the housing 141. The hinge 131 shown in FIG. 7 is fixed to the fixing member 161 with screws. The fixing member 161 is a plate-like member and is formed by a metal plate (hereinafter referred to "fixing metal plate") in the present embodiment.

As shown in FIG. 8, four fixing metal plates 161 are attached on the upper surface of the housing 141 of the original feeding portion 10. These four fixing metal plates 161 are used for fixing one hinge.

The housing 141 is made from resin and the fixing metal plate attaching portion 163 as a screw hole for attaching the fixing metal plate 161 with a screw as shown in FIG. 9. The positioning portion 165 (shown in FIG. 8) which is formed in a convex shape for positioning each fixing metal plate 161 is formed at the position on the housing 141 at which the fixing metal plate is attached. The fitting hole corresponding to the positioning portion 165 is formed on the fixing metal plate 161. The positioning portion 165 is fitted to the fitting hole, thereby positioning the fixing metal plate 161 with respect to the housing 141 and the fixing metal plate 161 is fastened and fixed to the housing 141 with screw 162 as a first fastening member. At this time, the screw 162 is fastened from the surface side (upper surface) which is covered by the outer cover 142. Thus, after the outer cover 142 is attached, the screw 162, the fixing metal plate 161 and so on are covered by the outer cover 142 and they are not exposed to the outside. The fixing metal plate 161 can be exchanged by removing the outer cover 142 and the screw 162.

The hinge 131 is attached to the original feeding portion 10 by attaching the hinge 131 to the fixing metal plate 161 while nipping the housing 141 between the fixing metal plate 161 and the hinge 131. Thus, a fixing portion formed on the hinge 131 is made from a metal plate and has a squared U-shape cross-section with an opening at the vertically downward side when the original feeding portion 10 is closed with respect to the image reading portion 20. Further, the edge portion is bent outwardly from the opening at a right angle. In FIG. 10, the hinge 131 is illustrated only by showing the outermost metal plate as a fixing portion and the compression spring 151 shown in FIG. 4 and so on are omitted.

As shown in FIG. 9, the hinge 131 is attached to the hinge attaching portion 164 as a screw hole formed on the fixing metal plate 161 by the screw 167 as a second fastening member over the housing 141. At this time, in order to position the hinge 131 with respect to the housing 141, the hinge positioning portion 166 which is formed in a convex shape is provided on the housing 141 as shown in FIGS. 11 and 12. The positioning is performed by fitting the hinge positioning portion 166 into the fitting hole formed on the hinge 131 and by screwing the screw 167 into the screw hole of the fixing metal plate 161 located at the opposite position with respect to the housing 141 in order to fasten and fix the hinge 131. At this time, as shown in FIG. 13, the screw 167 is fastened from the surface which is exposed when the original feeding portion 10 is opened with respect to the image reading portion 20. Namely, the screw 167 is fastened from the surface opposite to that in case where the fixing metal plate 161 is fastened with the screw 162.

Fastening of the hinge 131 can easily be performed by screwing the screw from the surface which is exposed when the original feeding portion 10 is opened. It is not necessary to hold the fixing metal plate 161 by hands when the hinge 131 is fastened and fixed and the fixing metal plate 161 is not detached from the housing when the screw 167 is removed in the case where the hinge 131 is to be removed. Thus, the attachment and detachment of the hinge 131 can be easily performed.

In the present embodiment, the hinge attaching portion 164 is disposed closer to the hinge 131 than to the fixing metal plate attaching portion 163 so that the area of the hinge attaching overlapping portion S shown in FIG. 12 can be reduced. Namely, the hinge attaching portion is provided at the part which is made by bending the edge of the squared U-shape cross-section outwardly from the opening as explained above (The hinge main body including the compression spring 151 and the like is disposed in the squared U-shape portion). As shown in FIG. 9, the hinge attaching portion 164 is disposed closer to the opening of the squared U-shape portion than to the fixing metal plate attaching portion 163.

On contrary, if the fixing metal plate attaching portion 163 is disposed closer to the hinge 131, the hinge attaching portion 164 is located far from the hinge and the hinge attaching overlapping portion S (the part bent outwardly from the opening) becomes wide considering the space of the apparatus. Thus, in this case, the waste of size occurs for the entire hinge. In the present embodiment, such a waste of size does not occur.

The hinge 131 which is attached to the original feeding portion 10 as explained above is fastened and fixed to the image reading portion 20 which is integrated with the main body of the apparatus using the fastening member 168 (refer to FIG. 3) so that the original feeding portion 10 is rotatably attached to the original feeding portion 10.

With the above configuration, when it becomes necessary to exchange the hinge 131 on the market, the hinge 131 can be removed from the original feeding portion 10 only by removing the four screws 167 shown in FIG. 12. Thus, the hinge can be exchanged only by fastening a new hinge 131 with the screws which are screwed at the same positions without removing the outer cover 142 of the original feeding portion 10.

Figure 14:
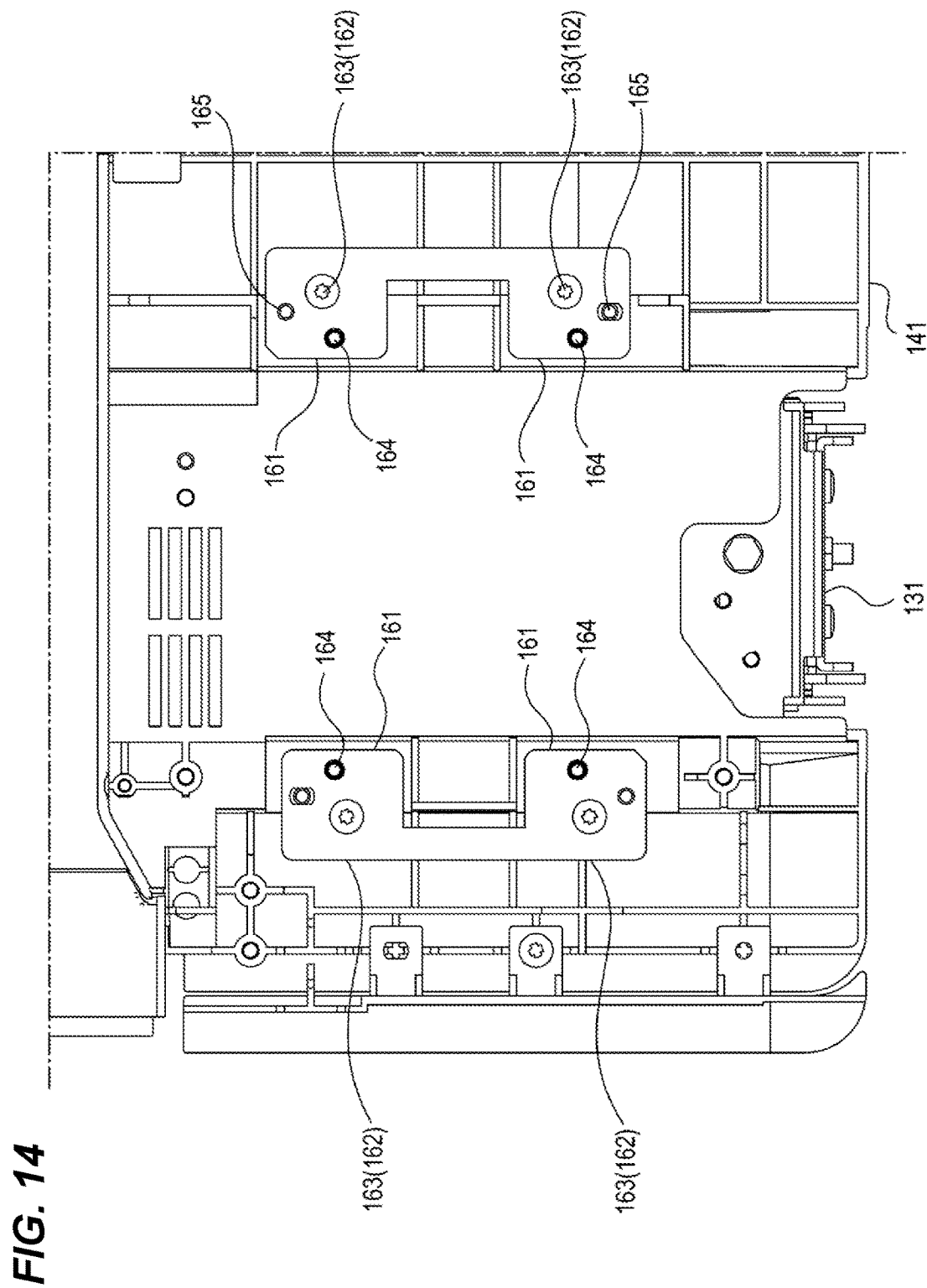
FIG. 14 is a diagram of a top view of another example of the hinge attaching portion to the housing of the original feeding portion.

Although four fixing metal plates 161 are used for fixing the single hinge 131 in the above embodiment, two fixing metal plates can be used for attaching the single hinge as shown in FIG. 14. Namely, the two hinges on the both sides of the hinge 131 among the four fixing metal plates 161 can be integrated into one. In such a case, the number of the fixing metal plates 161 can be reduced and the number of parts to be managed can be reduced.

As explained above, in the present invention, when attaching the hinge 131 to the original feeding portion 10, the fixing metal plate 161 is fixed to the housing 141 by a fastening member in advance. Thus, it is not necessary to take it into consideration that the fixing metal plate 161 is not shifted on the horizontal housing and the hinge 131 is easily attached. Conventionally, when the hinge 131 suddenly becomes out of order for example and it becomes necessary to exchange the hinge, due to the above consideration, the hinge must be attached while positioning the fixing metal plate 161 after the outer cover 142 of the original feeding portion 10 is removed. However, in such a situation, the hinge can be exchanged only by removing the screws which fix the hinge 131 to the fixing metal plate 161 from the bottom surface of the original feeding portion 10 without removing the cover in the present embodiment.

The fixing metal plate 161 is a plate-like member and the load of weight of the original feeding portion 10 to be applied to the housing 141 can be received on the wide surface of the fixing metal plate 161. Thus, enough strength is ensured for the hinge fixing portion. Thus, even when the screw portion of the single fixing metal plate 161 is damaged due to an application of an overload which exceeds the product specifications, the unit of the original feeding portion can be continuously used only by exchanging the fixing metal plate 161 because the fixing metal plate 161 is fixed in a detachably attachable manner. That is in case the fastening of the first fastening member is released and the fastening of the second fastening member is released, the fixing member is detachable from the frame and the rotatably connecting portion. Thus, maintenance cost and the user's downtime can be reduced.

In the above embodiment, the image reading apparatus in which the original feeding portion 10 is rotatably disposed on the image reading portion 20 in illustrated. However, the hinge attaching configuration in the above embodiment can be suitably used in the image forming apparatus 400 in which the image forming portion 401 which forms an image on a sheet (recording medium) is disposed below the image reading portion 20.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2015-175811, filed Sep. 7, 2015, which is hereby incorporated by reference herein in its entirety.

What is claimed is:

1. An image reading apparatus, comprising:
   an image reading portion configured to read an image on a sheet;
   a sheet feeding portion comprising a roller and configured to feed the sheet to a reading position of the image reading portion by the roller;
   a rotatably connecting portion which rotatably connects the sheet feeding portion to the image reading portion;
   a fixing member;
   a first fastening member configured to fasten the fixing member to a frame of the sheet feeding portion; and
   a second fastening member configured to fasten the fixing member to the rotatably connecting portion in a state where the frame is nipped between the rotatably connecting portion and the fixing member,
   wherein the fixing member does not include a roller, and
   wherein in case the fastening of the first fastening member is released and the fastening of the second fastening member is released, the fixing member is detachable from the frame and the rotatably connecting portion.

2. The image reading apparatus according to claim 1, wherein the second fastening member is a second screw and the rotatably connecting portion is fastened to the fixing member by the second screw from a surface side which is exposed when the sheet feeding portion is opened.

3. The image reading apparatus according to claim 1, wherein the first fastening member is a first screw and the fixing member is fastened and fixed to the frame by the first screw from an opposite surface side to a surface side to which the rotatably connecting portion is fastened by the first fastening member.

4. The image reading apparatus according to claim 3, wherein an outer cover is attached to the opposite surface side of the sheet feeding portion.

5. The image reading apparatus according to claim 1, wherein the fixing member is disposed on both sides of the rotatably connecting portion and the position of the second fastening member is closer to the position of the rotatably connecting portion than to the position of the first fastening member.

6. The image reading apparatus according to claim 1, wherein a positioning portion configured to position the fixing member and the rotatably connecting portion is provided on the frame.

7. The image reading apparatus according to claim 1, wherein the fixing member is configured by a metal plate.

8. The image reading apparatus according to claim 1, the fixing member is a plate-like shape.

9. An image forming apparatus, comprising:
an image reading apparatus; and
an image forming portion configured to form an image on a recording medium,
wherein the image reading apparatus comprises:
(1) an image reading portion configured to read an image on a sheet;
(2) a sheet feeding portion comprising a roller and configured to feed the sheet to a reading position of the image reading portion by the roller;
(3) a rotatably connecting portion which rotatably connects the sheet feeding portion to the image reading portion;
(4) a fixing member;
(5) a first fastening member configured to fasten the fixing member to a frame of the sheet feeding portion; and
(6) a second fastening member configured to fasten the fixing member to the rotatably connecting portion in a state where the frame is nipped between the rotatably connecting portion and the fixing member,
wherein the fixing member does not include a roller, and
wherein in case the fastening of the first fastening member is released and the fastening of the second fastening member is released, the fixing member is detachable from the frame and the rotatably connecting portion.

* * * * *